Figure 1:
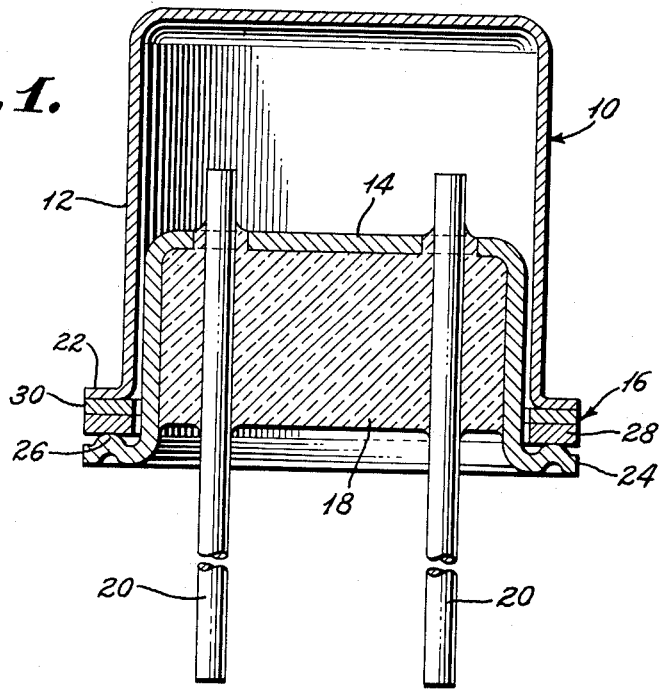

June 9, 1964

R. E. TRUEB ETAL 3,136,050

CONTAINER CLOSURE METHOD

Filed Nov. 17, 1959

INVENTORS
Robert E. Trueb and
Arnold M. Walkow

BY Stevens, Davis, Miller & Mosher
ATTORNEYS

United States Patent Office 3,136,050
Patented June 9, 1964

3,136,050
CONTAINER CLOSURE METHOD
Robert E. Trueb and Arnold M. Walkow, Dallas, Tex., assignors to Texas Instruments Incorporated, Dallas, Tex., a corporation of Delaware
Filed Nov. 17, 1959, Ser. No. 853,618
8 Claims. (Cl. 29—470)

The present invention relates to a closure device for a container and more particularly to a container utilizing a laminating technique to obtain a bonded closure.

Present fabricating techniques for containers, such as transistor packages or the like, are oftentimes susceptible to deviations from desired standards because of the complexity of the packaging or because of the type of materials that has to be utilized to form the closure. It is desirable to obtain a closure technique which will facilitate the fabrication of transistor packages, wherein mass production methods can be utilized without reduction of closure quality standards. Accordingly, a bonded closure utilizing a laminating technique with suitable co-acting materials adapted for use in the mass production of transistor packages would be extremely desirable.

Briefly, a transistor package consists of a cylindrical header portion made of any suitable material, such as, for example, of copper, Kovar, or the like, having suitable leads extending therethrough and a semiconductor element mounted thereon electrically coupled to the leads. A can member is concentrically secured on the header to encapsulate the semiconductor element.

The present invention, in its preferred form, comprises the fabrication of transistor packages incorporating a bonded closure adaptable to a laminating technique wherein similar metals, such as aluminum on aluminum, are bonded together. An aluminum clad steel ring is utilized between the can and header portions of the transistor package to facilitate the bonding of the similar metals. The juxtaposed aluminum laminations are subjected to an initial application of suitable pressure while the temperature is sufficiently elevated to seal the laminated portions together. If deemed desirable, the fabricating technique can be modified by eliminating the steel ring and the aluminum lamination placed directly on the header to directly cooperate with an aluminum can to form the bonded closure.

An object of the present invention is the provision of a transistor package utilizing a bonded closure technique to seal the can and header together.

Another object is to provide a package closure device utilizing metallic laminated elements subjected to elevated pressure and temperature to obtain a bonded seal.

A further object of the invention is the provision of a transistor packaging technique using a number of laminated surfaces with a coacting rigid element to obtain a bonded closure.

A further object of the invention is the provision of a packaging technique using a bonded laminated seal which facilitates the mass production of transistors while maintaining desired fabricating standards.

Figure 2:
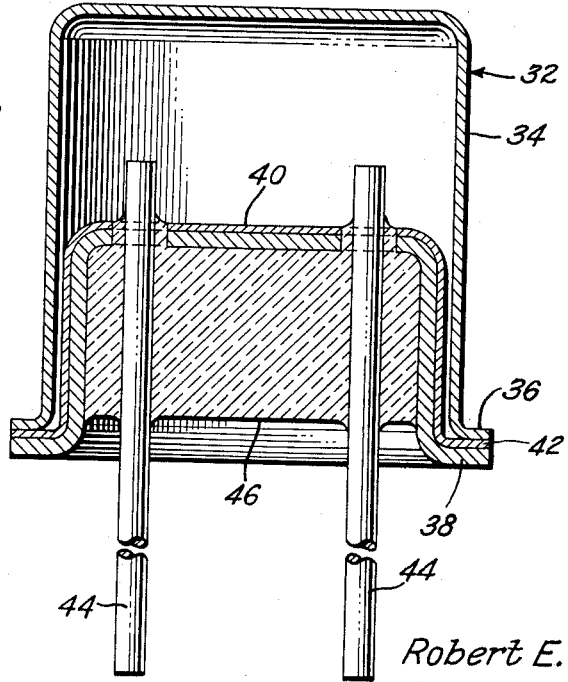

Other objects and many of the attendant advantages of this invention will be readily appreciated as the same becomes better understood by reference to the following detailed description and appended claims when considered in connection with the accompanying drawing in which like reference numerals designate like parts throughout the figures thereof and wherein:

FIGURE 1 is a side sectional view of a preferred embodiment of the invention; and FIGURE 2 is a side sectional view of a modification of the device of FIGURE 1.

Referring now to FIGURE 1 of the drawing, there is illustrated a preferred embodiment of a transistor package 10 having an inverted cup-shaped can member 12 concentrically mounted upon a header member 14. The can and header are interconnected by an intermediate ring structure means 16. The header is provided in a well known manner, with a conventional glass end portion 18 through which protrude a plurality of lead-in conductors 20. A semiconductor element, not shown, would be suitably encapsulated within the package and electrically coupled to the lead-in conductors.

The can 12, herein composed of aluminum, is formed with an annular flange portion 22. The header 14 is formed with an annular flange 24, and is composed of a suitable metal such as Kovar. Kovar, an alloy of iron, nickel, and cobalt produced commercially by The Driver-Harris Company of Harrison, New Jersey, is commonly employed as a header material in transistor package fabrication, since its coefficient of expansion is substantially similar to that of the type of glass used as the glass end portion 18. Additionally, the header is provided with an annular formed projection 26 which coacts with the ring structure means 16, as hereinafter described. The ring structure means consists of a metal circular ring 28 composed of steel and provided on one side with an aluminum cladding 30.

In sealing the package 10, the aluminum clad steel ring 28 is resistance welded onto the flange 24. The welding is facilitated by the projection 26 which allows weld formation between the adjacent surfaces of the steel ring 28 and the flange 24. In turn, the aluminum can 12 is bonded to the aluminum cladding on the steel ring through the application of sufficient pressure and heat. In preparation for bonding the components, the aluminum surfaces on the flange 22 and on the ring 16 are baked, without any prescrubbing required, in a hydrogen furnace at approximately 500° C. to remove water vapor contained therein.

Briefly, the bonding of the aluminum surfaces is accomplished by placing them in contact under pressure and applying heat to raise their temperature to approximately 350° C. This may be accomplished in a conventional welding type device. In this manner, a bonded closure is obtained which is susceptible to the mass production of transistor packages without the hinderance of complex material preparations and apparatus. In addition, the use of thermocompression bonding of the abutting aluminum surfaces will result in the hermetic sealing of the transistor package without the formation of harmful sealing vapors.

FIGURE 2 illustrates a modification 32 of the transistor package 10 wherein an aluminum can member 34 is provided with an integral annular flange portion 36. The can member is concentrically mounted on a copper header member 40, formed with an annular header flange 38 and clad with a layer of aluminum 42. The modification discloses a conventional transistor package having a plurality of copper leads 44 protruding through a glass end portion 46.

The modification 32 utilizes the same bonding technique as in the preferred embodiment, and only differs therefrom in that the ring structure 16 is eliminated and the aluminum is clad directly on the header 40. In addition, since the header and the leads are composed of copper, secondary advantages in heat transfer and current carrying capabilities are realized.

The bonding of the can flange 36 and the aluminum clad header flange 38 is accomplished by the application of sufficient pressure and heat as in the preferred embodiment. As heretofore set forth, the aluminum surfaces are prepared for bonding by baking, without prescrubbing, in a hydrogen furnace at approximately 500° C. to remove water vapor. The bonding is initiated by applying pressure and raising the temperature to approximately 350° C. in a conventional welding type device as before.

Briefly, the present invention discloses a fabricating technique for transistor packages wherein a bonding process is utilized to obtain a hermetic seal between coacting aluminum surfaces. In the preferred embodiment, an aluminum clad steel ring is used as an intermediate connecting member between the aluminum can 12 and the header 14, composed of Kovar or other suitable metal. The steel ring is welded to the projection 26 formed on the header annular flange 24, and the annular flange 22 of the can is thermocompression bonded to the aluminum clad surface 30. The bonded closure is accomplished by bonding the aluminum surfaces together with suitable applications of pressure and temperature. If deemed desirable, a modification of the fabricating technique of the preferred embodiment is set forth in modification 32, wherein the steel ring is eliminated and a coating or layer of aluminum placed directly on the surface of the header which may be of copper or other suitable material. Thus, the aluminum can flange 36 is thermocompression bonded with the aluminum surface on the header flange 38 to hermetically seal the transistor package.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. A method of obtaining a bonded closure for a transistor package which includes an aluminum can having a peripheral flange at the open end thereof and a Kovar header having a peripheral flange for correspondence with the flange of said can in opposing relation therewith, comprising the steps of
    (a) cladding one surface of a steel ring with aluminum,
    (b) resistance welding the unclad surface of said steel ring to the flange of said header, and
    (c) securing the aluminum clad surface of said steel ring to the flange of said aluminum can by thermocompression bonding.

2. A method of obtaining a bonded closure for a transistor package which includes an aluminum can having a peripheral flanges at the open end thereof and a Kovar header having a periperal flange for correspondence with the flange of said can in opposing relation therewith, comprising the steps of
    (a) forming a raised projection in the flange of said header concentric therewith,
    (b) cladding one surface of a steel ring with aluminum,
    (c) resistance welding the unclad surface of said steel ring to said raised projection in the flange of said header, and
    (d) securing the aluminum clad surface of said steel ring to the flange of said aluminum can by thermocompression bonding.

3. A method of obtaining a bonded closure for a transistor package which includes an aluminum can having a peripheral flange at the open end thereof and a copper header having a peripheral flange for correspondence with the flange of said can in opposing relation therewith, comprising the steps of
    (a) cladding one surface of the flange of said header with aluminum, and
    (b) securing the flange of said can to the aluminum cladding of said header by thermocompression bonding.

4. A method of obtaining a bonded closure for a transistor package which includes an aluminum can having a peripheral flange at the open end thereof and a Kovar header having a peripheral flange for correspondence with the flange of said can in opposing relation therewith, comprising the steps of
    (a) cladding one surface of a steel ring with aluminum,
    (b) resistance welding the unclad surface of said steel ring to the flange of said header,
    (c) preparing the aluminum surface of the flange of said can and the aluminum cladding of said steel ring by heating in a hydrogen atmosphere to remove any water vapor contained therein, and
    (d) securing the aluminum clad surface of said steel ring to the flange of said aluminum can by thermocompression bonding.

5. A method of obtaining a bonded closure for a transistor package which includes an aluminum can having a peripheral flange at the open end thereof and a Kovar header having a peripheral flange for correspondence with the flange of said can in opposing relation therewith, comprising the steps of
    (a) forming a raised projection in the flange of said header concentric therewith,
    (b) cladding one surface of a steel ring with aluminum,
    (c) resistance welding the unclad surface of said steel ring to said raised projection in the flange of said header,
    (d) preparing the aluminum surface of the flange of said can and the aluminum cladding of said steel ring by heating in a hydrogen atmosphere to remove any water vapor contained therein, and
    (e) securing the aluminum clad surface of said steel ring to the flange of said aluminum can by thermocompression bonding.

6. A method of obtaining a bonded closure for a transistor package which includes an aluminum can having a peripheral flange at the open end thereof and a copper header having a peripheral flange for correspondence with the flange of said can in opposing relation therewith, comprising the steps of
    (a) cladding one surface of the flange of said header with aluminum,
    (b) preparing the aluminum surface of the flange of said can and the aluminum cladding on the flange of said header by heating in a hydrogen atmosphere to remove any water vapor contained therein, and
    (c) securing the flange of said can to the aluminum cladding of said header by thermocompression bonding.

7. A method of obtaining a bonded closure for a transistor package which includes an aluminum can having a peripheral flange at the open end thereof and a Kovar header having a peripheral flange for correspondence with the flange of said can in opposing relation therewith, comprising the steps of
    (a) cladding one surface of a steel ring with aluminum,
    (b) resistance welding the unclad surface of said steel ring to the flange of said header,
    (c) preparing the aluminum surface of the flange of said can and the aluminum cladding of said steel ring by heating to approximately 500° C. in a hydrogen atmosphere to remove any water vapor contained therein, and
    (d) securing the aluminum clad surface of said steel ring to the flange of said aluminum can by heating to approximately 350° C. and applying sufficient pressure between said flange of said can and said ring to obtain a thermocompression bond.

8. A method of obtaining a bonded closure for a transistor package which includes an aluminum can having a peripheral flange at the open end thereof and a copper header having a peripheral flange for correspondence with the flange of said can in opposing relation therewith, comprising the steps of
    (a) cladding one surface of the flange of said header with aluminum,
    (b) preparing the aluminum surface of the flange of said can and the aluminum cladding on the flange of said header by heating in a hydrogen atmosphere to approximately 500° C. to remove any water vapor contained therein, and (c) bonding the flange of said can to said aluminum cladding of said header by heating to approximately 350° C. and applying sufficient pressure between said flange of said can and said aluminum cladding to obtain a thermocompression bond.

References Cited in the file of this patent

UNITED STATES PATENTS

| | | |
|---|---|---|
| 2,270,278 | Dunn | Jan. 20, 1942 |
| 2,304,666 | Sturges | Dec. 8, 1942 |
| 2,314,105 | Rose | Mar. 16, 1943 |
| 2,481,614 | Redmond | Sept. 13, 1949 |
| 2,539,248 | Lynch et al. | Jan. 23, 1951 |
| 2,720,997 | Dailey | Oct. 18, 1955 |
| 2,818,638 | Seck | Jan. 7, 1958 |
| 2,920,786 | Duran | Jan. 12, 1960 |
| 2,934,588 | Ronci | Apr. 26, 1960 |
| 2,977,675 | Simms | Apr. 4, 1961 |
| 3,005,867 | Green et al. | Oct. 24, 1961 |
| 3,006,067 | Anderson et al. | Oct. 31, 1961 |
| 3,020,454 | Dixon | Feb. 6, 1962 |